United States Patent [19]

Ryder et al.

[11] Patent Number: 4,632,055
[45] Date of Patent: Dec. 30, 1986

[54] APPARATUS FOR TINTING SOFT CONTACT LENSES

[75] Inventors: Francis E. Ryder; Fred E. Williams, both of Arab, Ala.

[73] Assignees: Ryder International Corp., Arab, Ala.; National Patent Development Corp., New York, N.Y.

[21] Appl. No.: 715,095

[22] Filed: Mar. 22, 1985

[51] Int. Cl.[4] .................. B05C 3/109; B05C 11/00
[52] U.S. Cl. ................................ 118/703; 118/406; 118/415; 118/421; 118/429; 118/704; 118/705
[58] Field of Search .............. 118/314, 406, 421, 415, 118/429, 703–705; 8/507; 351/160 H, 162; 427/164

[56] References Cited

U.S. PATENT DOCUMENTS

| 4,252,421 | 2/1981 | Foley | 8/507 |
| 4,457,761 | 7/1984 | Sliger | 8/507 |
| 4,518,390 | 5/1985 | Rabenau et al. | 8/507 |

FOREIGN PATENT DOCUMENTS

| 52-11860 | 1/1977 | Japan | 118/415 |
| 2035686 | 6/1980 | United Kingdom | 118/415 |

Primary Examiner—Evan K. Lawrence
Attorney, Agent, or Firm—Trexler, Bushnell & Wolters, Ltd.

[57] ABSTRACT

An apparatus for tinting a soft contact lens which is received in a fixture including an inlet and an outlet for directing predetermined fluids therethrough for engagement with predetermined surfaces of the contact lens. The apparatus comprises a carrier for carrying the fixture in a predetermined orientation; a guide arrangement for defining a predetermined path of travel; a motive assembly for propelling the carrier along the predetermined path; and a plurality of fluid application stations arranged along the path, each fluid application station including a fluid release member. The guide track and the motive assembly cooperate for aligning the inlet of the fixture with each fluid release member sequentially as the carrier travels along the predetermined path, for delivering a quantity of fluid to the fixture and the contact lens therein. A method for tinting soft contact lenses comprises the steps of mounting a contact lens to a fixture including an inlet and an outlet for directing predetermined fluids therethrough for engagement with predetermined surfaces of the contact lens; mounting the fixture to a carrier in a predetermined orientation; guiding the carrier along a predetermined path of travel; arranging a plurality of fluid application stations along the predetermined path, each fluid application station including a fluid release member; and further moving the carrier as it moves along said path in a direction for aligning the inlet of the fixture with each of the fluid release members, sequentially for delivering a quantity of fluid to the inlet.

20 Claims, 7 Drawing Figures

APPARATUS FOR TINTING SOFT CONTACT LENSES

BACKGROUND OF THE INVENTION

This invention is directed generally to the tinting or coloration of contact lenses for human eyes, and more particularly to a novel apparatus for carrying out such tinting.

In recent years, the so-called "soft" contact lenses have met with widespread acceptance. Such soft contact lenses are manufactured from a hydrophilic plastic material; that is, they can absorb and retain water, and become soft and pliable upon absorption of water. They are therefore relatively comfortable for the user to wear and can be worn for relatively long periods of time.

Tinted or colored soft contact lenses have additional advantages or attractions to many contact lens wearers. For example, tinted lenses may be desired for cosmetic reasons by patients. Such cosmetic improvement may be particularly advantageous in the case where the patient's eyes have been discolored or disfigured by illness or accident. Such tinted lenses may also be advantageously used by patients with diplopia to make the eyes appear more normal. Similarly, such tinted lenses may provide albino and aniridic patients with improved general ocular and facial appearances. Tinted lenses may also be utilized to reduce light transmission and enhance visual comfort in the presence of high light levels.

A number of methods of coloring the central areas of contact lenses have been suggested, for example in U.S. Pat. No. 4,252,421 to Foley, Jr. However, the tinting or coloration of contact lenses is not a simple task. In this regard, it is important that the tinted or colored lens provide a natural appearance in the wearer's eye. Thus, the tinted lens should preferably have a clear central area, a colored intermediate area and a clear outer area so that the colored portion will not cover the sclera of the eye. However, in cases where it is desired to further reduce light transmission, the central portion may be colored or tinted as well. Generally then, it is desirable to be able to provide the lens with a circular and preferably annular tinted area surrounded by clear, untinted lens material, so as to generally correspond to the normal appearance of the eye.

In manufacturing such a tinted lens, several problems can arise with respect to mounting the lens on a tinting fixture. U.S. Pat. No. 4,518,390 to Richard Rabenau and Jeffery Allen Ryder discloses one particularly advantageous such tinting fixture. The tinting fixture disclosed in this patent advantageously alleviates problems associated with handling of the lens during tinting or coloration thereof. Advantageously, this fixture readily centers and mounts the lens thereupon automatically to obtain the desired ring-like or annular pattern of tinting, while maintaining relatively sharp borders or edges intermediate tinted and untinted portions of the lens. In this regard, it will be appreciated that maintaining a clearly defined area of coloration is important since even slight fuzziness or running of dye colors into uncolored areas of the lens will be immediately apparent. Such fuzziness or tint runs will necessitate the rejection of the finished lens product.

Heretofore the process of tinting lenses was carried out exclusively in lens manufacturing facilities utilizing relatively complex, expensive and sophisticated equipment. Moreover, operation of this equipment required relatively skilled, highly trained technicians or operators.

Such tinting of lenses generally involves placement of the lens on a fixture as discussed above, and thereafter applying a predetermined amount of heat energy to the lens to enhance the setting or fixing of the dye thereupon. Thereafter a number of operations must be carried out in sequence, including, after initially applying a suitable dye thereto, allowing a period of time to allow the dye to set. This dye is applied to the interior surface of the lens and allowed to permeate during the ensuing period into the pores of the material. Thereafter, several additional chemical agents must be utilized in sequence to complete the dyeing or tinting process.

Initially, following application of the dye and the setting or initial drying period, a sodium nitrite solution, preferably of 5% concentration, is applied to the lens. Immediately thereafter, a dilute sulfuric acid solution also of substantially 5% concentration is applied. In response to application of the sulfuric acid, which acts as an oxydizing agent, the water soluble dye precipitates and becomes a water in soluble salt entrapped within the polymer matrix of the lens. Finally, a sodium bicarbonate solution also of substantially 5% concentration is applied to neutralize the sulfuric acid previously applied during the oxidation phase or process. Following the addition of the sodium bicarbonate solution, the lens may be removed from the fixture, cleaned with a suitable cleaner and subjected to a heat disinfection cycle prior to dispensing to the patient.

As mentioned previously, such a process has heretofore required relatively complex and expensive equipment, as well as extensive handling of the contact lenses and/or fixtures by skilled, trained personnel, during the tinting process. Hence, such tinting has heretofore been carried out primarily by contact lens manufacturers having the proper equipment and trained personnel to complete the tinting process. Accordingly, patients wishing tinted contact lenses must initially be fitted for lenses by a qualified eye care specialist, and thereafter lenses of the desired color must be ordered from the lens manufacturer.

Hence, the patient must wait for some period of time to receive the desired tinted lenses. However, many eye care specialists may desire to dispense tinted lenses directly to the patient, thus more quickly achieving the desired vision correction and desired cosmetic improvement during but a single office visit. However, heretofore such immediate dispensing of tinted lenses has not been possible.

OBJECTS AND SUMMARY OF THE INVENTION

Accordingly, it is a general object of the invention to provide an improved apparatus for tinting contact lenses which may advantageously be carried out without the need for relatively expensive and cumbersome equipment or extensive handling by specially trained, skilled personnel.

A related object is to provide an apparatus in accordance with the foregoing object which may be utilized to produce tinted contact lenses in the office of the eye care specialist, without necessitating submission of orders to a manufacturer and the ensuing waiting period as described hereinabove.

A further related object is to provide an apparatus in accordance with the foregoing objects which highly automates the tinting process so as to require no manual handling of the lens during any point in the process, and so as to permit operation of the apparatus by relatively unskilled personnel with minimal training.

Briefly, and in accordance with the foregoing objects, the invention provides an apparatus for tinting a soft contact lens which is received in a fixture including inlet means and outlet means for directing predetermined fluids therethrough for engagement with predetermined surfaces of said contact lens to tint said lens, said apparatus comprising: carrier means for carrying said fixture therein in a predetermined orientation; guide means for defining a predetermined path of travel; motive means for propelling said carrier means along said predetermined path of travel; and a plurality of fluid application stations arranged along said path of travel, each fluid application station including fluid release means; said guide means and said motive means cooperating for aligning the inlet means of said fixture with each said fluid release means in sequence as said carrier travels along said predetermined path of travel, for delivering a quantity of fluid to the fixture and the contact lens therein.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1A:
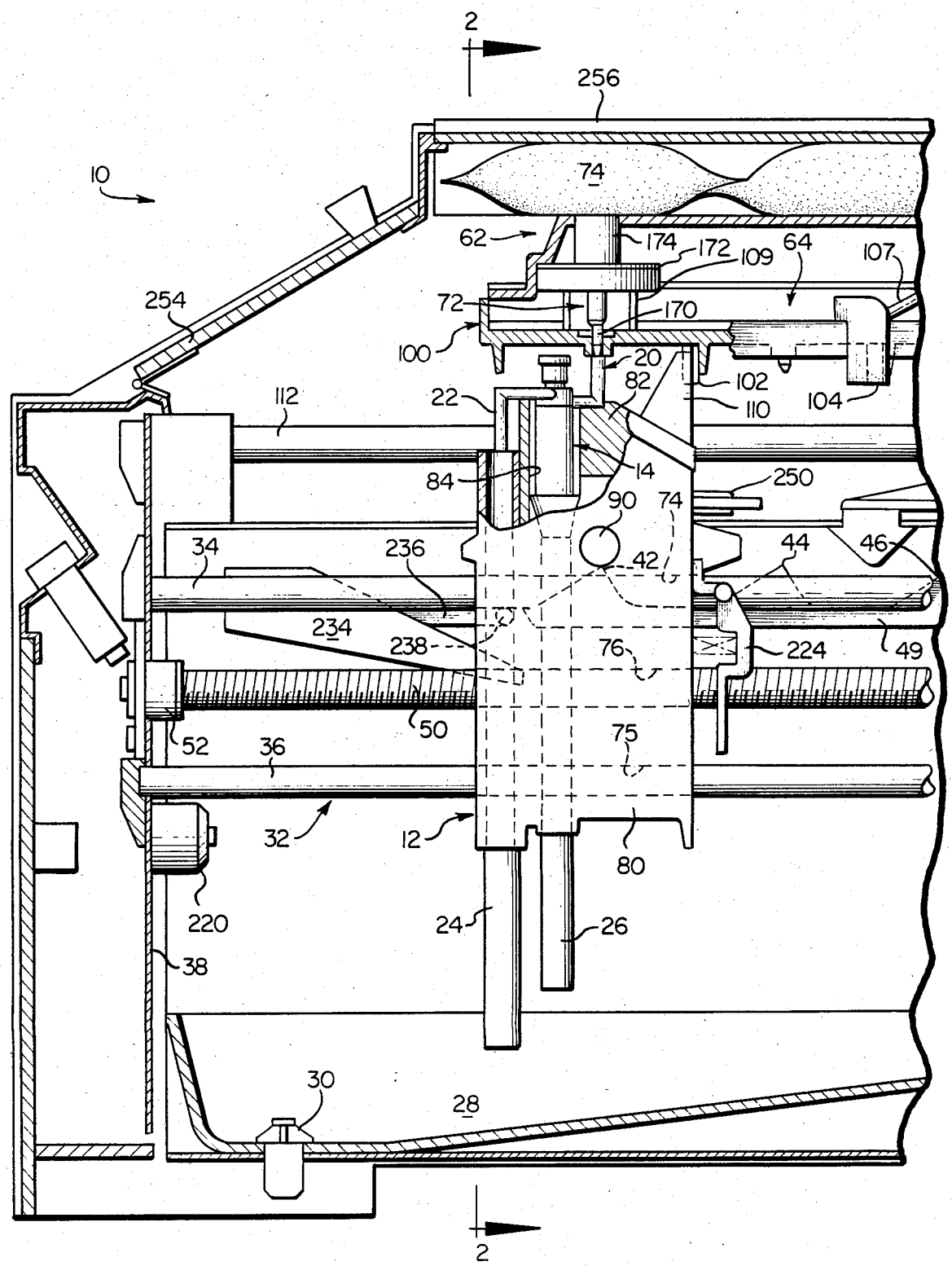
FIGS. 1A and 1B together form a side elevation, partially in section and partially broken away, of apparatus in accordance with the invention.
Figure 1B:
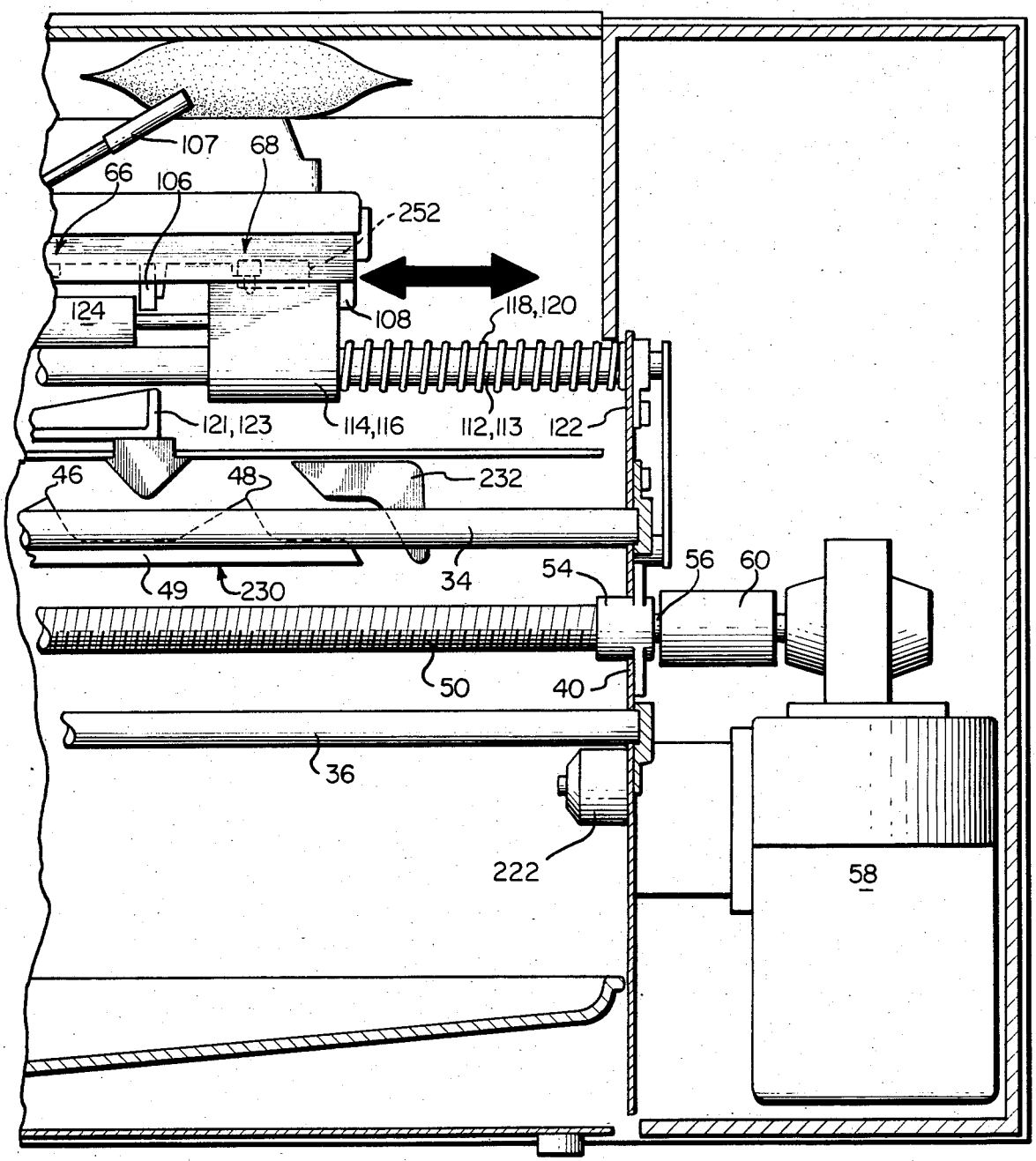
Figure 2:
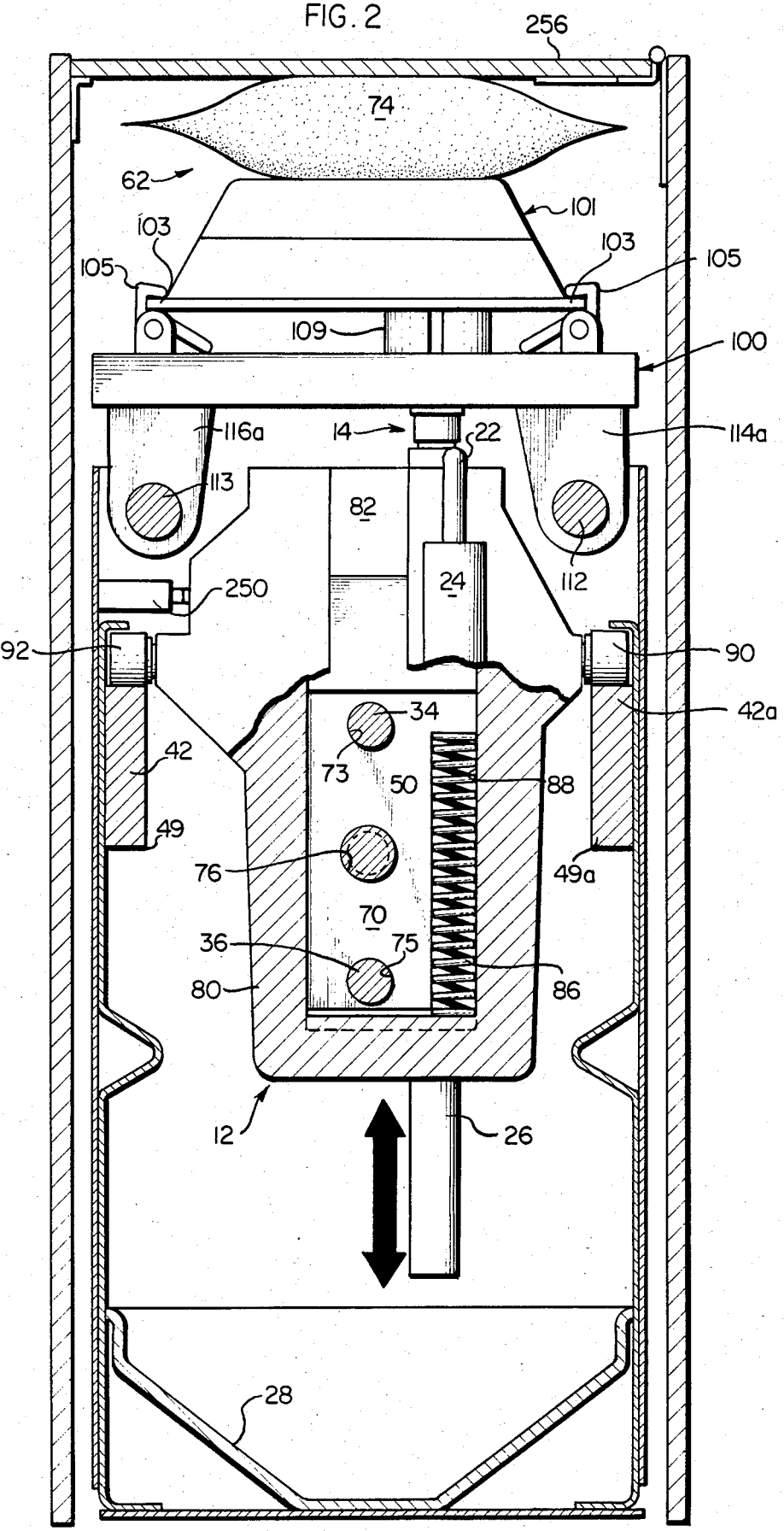
FIG. 2 is a sectional view taken generally in the plane of the line 2—2 of FIG. 1.

Referring now to the drawings and initially to FIGS. 1 and 2, a machine or apparatus for tinting soft contact lenses in accordance with the invention is designated generally by the reference numeral 10. This apparatus 10 includes a carrier structure or carrier means designated generally by reference numeral 12. This carrier means is arranged to mount or receive therein a contact lens-receiving fixture 14. This fixture 14 will be described more fully later with reference to FIG. 4. Suffice to say that the fixture 14 includes a generally tubular body 16 for mounting a contact lens (not shown in FIG. 1) therein. This fixture 14 includes inlet means 20 and outlet means 22 in communication with the tubular body 16 for receiving or directing a flow of fluid therethrough for contact with predetermined surface portions of the contact lens (not shown) held therein.

Figure 4:
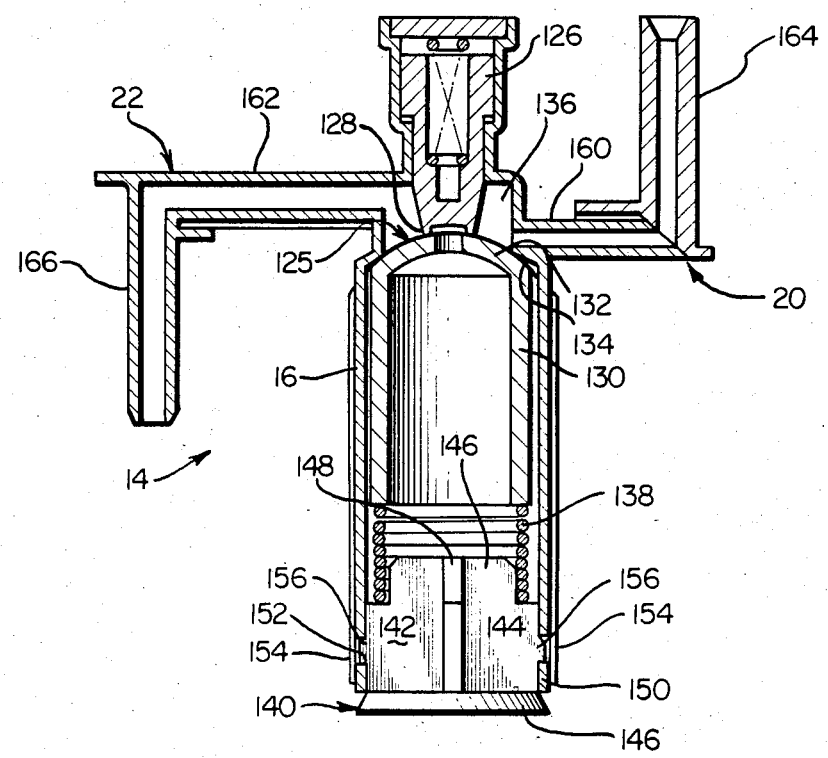
FIG. 4 is an enlarged side elevation of a lens-holding fixture particularly useful in connection with the apparatus of the invention.

As mentioned, the mounting or holding of the contact lens within tubular body 16 is more fully illustrated in FIG. 4. In this regard, the carrier means defines therethrough respective drain channels or conduits 24 and 26 which extend generally vertically therethrough for directing excess fluid to a waste fluid receptacle or tray 28 located at a bottom of the machine or apparatus 10. This tray 28 may be provided with a suitable drain plug 30 for periodic emptying of waste fluid. More particularly, drain channel or conduit 24 receives excess fluid from outlet 22 while drain channel or conduit 26 receives excess fluid from the tubular body 16, as will be more fully appreciated upon later reference to FIG. 4.

Referring more particularly to the apparatus 10, in accordance with the invention, a guide arrangement or guide means is provided defining a predetermined path of travel for the carrier member or means 12. In this regard, the guide means is designated generally by reference numeral 32 and includes elongate rail means comprising a pair of generally parallel and axially coextensive elongate rod members 34, 36 which run horizontally between opposite interior walls 38, 40 of the machine or apparatus 10. Also defining this path of travel within the apparatus or machine 10 are cam means 41 comprising a plurality of cam surfaces or cams 42, 44, 46 and 48 arranged at predetermined locations along an elongate base or track 49 which parallels the horizontal line of travel of the carrier as generally defined by the elongate rails 34 and 36.

In accordance with a further feature of the invention, motive means are provided for driving or propelling the carrier 12 relative to the guide means comprising rails 34, 36 and cams 42, 44, etc. In the illustrated embodiment, the motive means comprise an elongate, threaded drive screw element or member 50 which is generally coextensive with the rails 34 and 36. That is, the drive screw 50 extends from a bearing 52 provided therefor in the wall 38 to and through a similar bearing 54 provided in opposite wall 40. In the illustrated embodiment, an unthreaded, reduced diameter portion 56 of drive screw 50 extends through the bearing 54 to be rotatably driven by a motor 58 comprising the remaining portion of the motive means, by way of a coupling 60.

A plurality of fluid application stations 62, 64, 66 and 68 are provided along the horizontal length of the apparatus or machine 10. Each of these fluid application stations is substantially identical in structure, whereby only the first station 62 will be fully described. The station 62 includes fluid release means 72 alignable with the inlet means 20 of the fixture 14 as the carrier 12 travels along the path of travel 32 defined by rails 34, 36 and cams 42, 44, etc. This fluid release means 72 is arranged for delivering a quantity of fluid to the inlet means 20 when it comes in contact therewith as illustrated in FIG. 1A. As will be more fully described later with reference to FIG. 3, the fluid release means 72 includes a novel valve arranged to deliver a predetermined and premeasured quantity of fluid from a reservoir 74 to the contact lens in the fixture 14 by way of the fixture inlet 20.

This application of fluid, as will be more fully described presently, takes place as the carrier 12 is being propelled along the rails 34, 36 and cam surfaces 42, 44, etc. by rotation of the drive screw 50. In this regard, the cams 42, 44, etc. are arranged for directing the carrier 12, simultaneously with its movement in the horizontal direction along rails 34, 36 in a direction generally orthogonal to this horizontal direction. In the illustrated embodiment, this orthogonal direction comprises the vertical direction as viewed in FIGS. 1 and 2. The predetermined orientations and locations of these cams 42, 44, etc. are respectively selected for directing the carrier means 12 toward each of the fluid application stations 62, 64, etc. in sequence, with the fixture 14, and particularly the inlet means 20 thereof, being oriented for alignment of the inlet means 20 with the fluid release means 72 of each fluid application station, as illustrated with respect to station 62 in FIG. 1A.

In order to achieve this motion, and referring also to FIG. 2, the carrier means 12 includes a block member 70 comprising a generally rectilinear block having through openings 73, 75 slidably engaged with the rails 34, 36. The block 70 also has an internal through screw thread 76 engaged with the drive screw element 50 for linear movement therealong in response to rotation thereof. The carrier 12 further includes a generally U-shaped yoke member 80 which is surroundingly slidably engaged with the block member 70 for movement relative thereto substantially only in the orthogonal direction relative to the horizontal path. In the illustrated embodiment, this othogonal direction comprises the vertical direction as viewed in FIGS. 1 and 2.

The yoke member receives therein a mounting structure or means 82 which defines a well 84 for removably receiving the fixture 16 therein. The previously mentioned drain apertures or channels 24, 26 are also defined on the yoke 80 and drain 26 extends through the block 70. In accordance with a preferred form of the invention, the carrier means 12 further mounts heater means schematically indicated at 83 for heating the area about well 84 so as to apply a predetermined amount of heat energy to the fixture 14 and to a contact lens received therein. As will be seen presently, such heating is useful in carrying out portions of the tinting process.

Referring still to FIG. 2, it will be seen that the carrier 12 further includes means in the form of a compression spring 86 for normally biasing the yoke member 80 in a direction away from the direction of movement thereof for engagement of the inlet means 20 with the fluid release means 72, that is, in a generally vertically downward direction as viewed in FIGS. 1 and 2. This compression spring is retained within a well or channel 88 provided therefor in the block 70 and bears respectively against an end of this channel 88 and a facing surface of the yoke member 80.

The yoke member 80 will further be seen to include cooperating guide means in the form of a pair of laterally outwardly extending rollers 90, 92 for engaging the cams or cam surfaces 42, 44, etc. as the block 70 travels along the rails 34, 36. These rollers 90 and 92 are rotatably mounted to oppositely laterally extending shaft members 94, 96 which extend from the yoke member 80. Accordingly, the guide means or rollers 90, 92 engage the cams 42, 44, etc. to cause the movement of the yoke member 80 in a generally vertical direction relative to the block member 70, simultaneously with horizontal movement thereof along rails 34, 36, in the region of each of the fluid application stations 62, 64, etc. In this regard, it will be appreciated from FIG. 2 that a similar set of cams or cam surfaces 42a, etc. are provided to the opposite side of the apparatus for guiding the cooperating guide member or roller 90. Accordingly, and as will be more fully described with reference to the schematic showing in FIGS. 5 through 7, the motion of the fixture 14 relative to the fluid application stations 62, 64, etc. is defined by the vertical upward and downward motion of the yoke 80 as it rides upon the cams 42, 44, etc. simultaneously with the horizontal motion thereof defined by the linear horizontal motion of the mounting block 70 along the drive screw 50. Accordingly, the cams 42, 44, are shaped and located to place the inlet 20 in contact with the fluid release means 72 of each station as the carrier 12 and hence fixture 14 approach the station.

It will be appreciated that some finite amount of time is required to apply a predetermined and premeasured quantity of fluid to the lens within fixture 14 at each of the stations 62, 64, etc. Accordingly, at least the fluid release means 72 of each of the fluid application stations is mounted to a tray member 100 which is in turn mounted for movement in a generally horizontal direction in parallel with the elongate rails 34 and 36. That is, the tray member 100 is moved in unison with the carrier 12 during a period of time in which the inlet 20 is in contact with the fluid release means 72. In order to achieve this movement of the tray 100, the tray 100 includes a plurality of downwardly depending projections or fingers 102, 104, 106 and 108 associated respectively with the fluid application stations 62, 64, 66 and 68. Cooperatively, the carrier 12 includes an upwardly extending cooperating projection member 110 which is sequentially engagable with each of the tray means projections 102, 104, etc. as the carrier proceeds sequentially along the stations.

In the illustrated embodiment, the downwardly depending projections 102, 104, etc. comprise generally wedge-shaped members and cooperatively, the upwardly extending projection 110 of carrier 12 defines a complementary V-shaped notch for positively engaging each of the projections 102, 104, etc. Hence, the projections interengage to move the tray member 100 in unison with the carrier means 12 substantially simultaneously with the alignment of the fixture inlet means 20 with the fluid release means 72 of each fluid application station.

To accommodate in this movement, the tray member 100 is slidably mounted to a pair of elongate guide rail members 112, 113 which are generally horizontally coextensive with as well as parallel with the guide rails 34 and 36 across the interior length of the apparatus 10. Two pairs of bearing blocks 114, 114a and 116, 116a are provided rigidly mounting the tray 100 and having bearing apertures slidably engaged with the respective rails 112 and 113.

Moreover, spring biasing means, comprising a pair of compression springs 118, 120 (only one of which can be seen in FIG. 1) surroundingly engage guide rails 112 and 113 for urging the tray 100 toward an initial or rest position thereof. This initial or rest position is thus assumed following release of each of the projections 102, 104, etc. thereof by the cooperating projection 110 of the carrier 12 as it leaves or recedes from each of the fluid application stations. The springs 118 and 120 are arranged to abut an inner wall or stop surface 122 on the one side and sidewall surfaces of the respective bearing blocks 114 and 116 on the other side. In accordance with a preferred form of the invention, an additional shock absorber in the form of a piston-and-cylinder arrangement designated generally by reference numeral 124 may also be provided to cushion the resilient return of the tray under the influence of springs 118 and 120. Cooperatively, a pair of stop members 121 and 123

(only one of which can be seen in FIG. 1) are provided for respectively abutting opposite surfaces of bearing blocks 114, 116 to define this initial or rest position of the tray 100.

In the embodiment illustrated, as best viewed in FIG. 2, the respective fluid applications stations 62, 64, including the respective fluid release means 72 and fluid supply reservoirs 74 thereof are preferably provided as a unitary member or unit designated generally by the reference numeral 101. This unit 101 includes oppositely laterally outwardly projecting flanges 103, which are held in place with respect to the tray 100 by a pair of elongate, spring-loaded gripper members 105 pivotally mounted to tray 100. These grippers are pivoted upwardly and downwardly, for alternately releasing and gripping flanges 103, by a lever 107 (see FIG. 1). The unit 101 also preferably includes a plurality of cylindrical extensions or sleeves 109 for surrounding an outlet nozzle or nipple portion 170 of each of the fluid release means or valves 72 which will be more fully described presently with reference to FIG. 3.

Reference is next invited to FIG. 4, wherein the structure of the fixture 14 is illustrated in additional detail. Initially, it will be noted that the fixture 14, in accordance with a preferred embodiment of the invention, is substantially similar to a fixture illustrated and described in U.S. Pat. No. 4,518,390 to Richard Rabenau and Jeffery Allen Ryder, to which reference is invited.

In this regard, the fixture 14 will be seen to comprise an elongate tube 16 into which the contact lens 125 is introduced. The contact lens 125 can be dropped or otherwise inserted into the tube 16, which is preferably filled with a suitable saline or other solution during insertion of the lens. A tube-closing and lens innermask member 126 includes a generally annular end rim portion 128 for engaging a central portion of the lens 125 and for masking a central lens surface portion to prevent application of dye thereto. This corresponds generally to a central, circular area of the lens which would overlie the pupil of the wearer's eye. The opposite surface of the lens 125 is supported upon a generally tubular mandrel member 130. This mandrel has a convexly curved leading end surface 132 to generally conform to the curvature of the lens 125 to be supported thereupon.

Moreover, the tube 16 of the fixture 14 defines a generally inwardly extending annular shoulder portion 134 against which an annular outer edge portion of the curved surface 132 presses an outer annular edge or rim portion of lens 125. This effectively masks this outer annular edge or rim portion of lens 125 against receiving dye thereupon. In this regard, the dye flows through a chamber 136 which is defined generally around the lens 125 supported on mandrel 130, surrounding the plug and mask member 126.

Preferably, the mandrel 130 is spring loaded so as to hold the lens 125 against both the shoulder 134 and the annular end 128 of member 126. This spring biasing is accomplished by a generally cylindrical compression spring 138 which abuts a trailing end of mandrel 130 and is compressed at its opposite end by a spring cap closure member 140. This spring cap closure member 140 may include a pair of generally orthogonally disposed surfaces or walls 142, 144 which extend inwardly from a disc-like end closure member 146. The respective orthogonal surfaces or walls 142, 144 preferably include inwardly extending shoulder portions 146 and 148 of similar cross-sectional dimension to the inner diameter of the compression spring 138 for receiving the compression spring thereabout in a press fit. Mandrel 130 may cooperatively include a plurality of radially outer, axially upwardly projecting alignment fingers 131, 133, etc. for surroundingly engaging an outer surface of the spring 138 to further position the spring with respect to its abutment with the end surface thereof.

In order to removably couple the end closure 140 with the upper end of the tube 16 as viewed in FIG. 4, the tube 16 is provided with an axially spaced apart upper annular rim or end portion 150 of similar diameter thereto. This spaced apart rim 150 is supported upon a plurality of frangible support members or fingers 154 to define an annular space 152. Cooperatively, the end closure member 140 includes outwardly projecting, and preferably wedge-shaped teeth 156 for snappingly engaging the annular rim 150 by projecting somewhat into the annular space 152 defined thereby. Accordingly, when the fixture has been used to tint a contact lens, the finished tinted lens may be removed therefrom by breaking the frangible connecting members 154 and removing the mandrel 130 from the tube 16.

Referring to the upper end of tube 116, respective inlet and outlet conduits 20 and 22 will be seen to include generally oppositely projecting tubular portions 160 and 162. Hence, inlet 20 and outlet 22 also include right angle elbows 164 and 166 respectively applied to these outwardly extending tubular members 160 and 162 of tubular body 16, each of which communicates with the chamber 136 as previously described.

Figure 3:
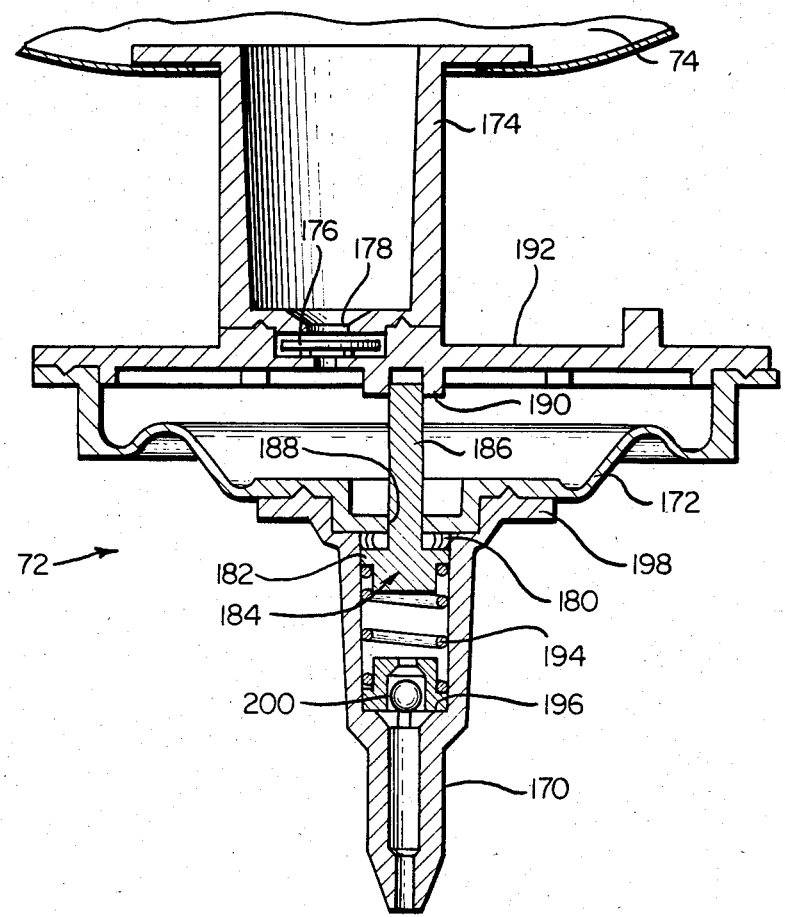
FIG. 3 is an enlarged sectional view of a valve assembly portion of the apparatus of the invention.

Reference is next invited to FIG. 3 wherein the structure of the fluid release means or member 72 is illustrated. It will be remembered that a substantially identical fluid release means is provided for each of the fluid application stations 62, 64, etc. whereby only one such fluid release means or member will be described. Generally speaking, the fluid release member 72 comprises a valve or valve/pump having a projecting elongate outlet nozzle or nipple 170 defining an axis and a flexible, compressible diaphragm portion 172 coupled with the nipple 170. This flexible diaphragm 172 is responsive to generally axially upward displacement of the nipple 170 as viewed in FIG. 3 for compressing and thereby releasing or pumping fluid therefrom through the nipple 170. In this regard, the projecting tubular member or inlet elbow 160 of the inlet conduit 20 applies a generally axial force to nipple 170 as it moves into the position illustrated in FIG. 1A, for example, to achieve the amount of axial displacement of nipple 170 necessary to fully compress diaphragm 172 for release of fluid therefrom. In this regard, the fluid reservoir 74 is mounted generally vertically above the valve structure 72 and is coupled thereto by a short generally cylindrical tubular neck portion 174.

The valve 72 includes a first check valve comprising a generally flat, disc-like check valve 176 intermediate the reservoir 74 (at the neck 174) and the diaphragm 172. It will be seen that with the diaphragm in an uncompressed condition as illustrated in FIG. 4, the check valve or disc 176 is permitted to move away from an inlet opening 178 of neck 174 to permit the fluid from reservoir 74 to enter and fill diaphragm 172. Advantageously, the volume of the relaxed or uncompressed diaphragm 172 is selected to give a predetermined, measured quantity of fluid when diaphragm 172 is thus filled. Accordingly, when compressed by inlet means 20, the diaphragm releases a premeasured quantity of fluid to the fixture for tinting the contact lens held therewithin. On the other hand, it will be recognized that when the diaphragm 172 is in its compressed condition (as illustrated if FIG. 1) the disc-like check valve 176 will be held pressed against opening 178 (not shown) thus preventing the ingress of further fluid thereto.

The valve means 72 will be seen to include a second check valve, here taking the form of a generally annular valve seal 180 engaged under the enlarged head portion 182 of an elongate valve plunger member 184. This valve plunger 184 includes an elongate body or shaft portion 186 which extends upwardly through a central through aperture 188 provided in diaphragm 172. An opposite or free end of elongate shaft portion 186 is engaged in a complementary annular projecting sleeve 190 provided in a generally circular pump top portion 192 which also supports and sealingly receives the diaphragm 172. It will be seen that some amount of axial play for the shaft 186 is permitted within rim 190 to assure full seating of enlarged head 182 and thus of valve seal member 180 with respect to the through aperture 188.

Valve plunger 184 is normally spring biased by a compression spring 194 into its closed condition relative to aperture 188, this spring 194 abutting an opposite side of rim 182 and an inner annular shoulder surface 196 of nipple 170. It will be seen that the nipple or nozzle 170 includes an upper outwardly flared annular wall portion 198 which abuts and is coupled with a facing surface of diaphragm 172. Accordingly, it will be seen that when the nipple or nozzle 170 is displaced or pressed axially upwardly as viewed in FIG. 4, the shaft 186 will bottom out within 190, permitting the valve seal 180 to become disengaged from aperture 188 thus permitting flow to and through the nozzle or nipple 170. A further or third check valve 200 which in the illustrated embodiment takes the form of a ball check may also be disposed intermediate the check valve 180 and the outlet of the nipple 170 to substantially prevent back flow of fluid through the nipple 170.

Referring again to FIG. 1, the motor 58 preferably comprises a reversible motor for bidirectionally rotating the drive screw 50, and thereby propelling the carrier means bidirectionally in the horizontal plane. Cooperatively, respective limit switches or limit switch means 220 and 222 are located at opposite horizontal extremities of the path of travel. These limit switches 220 and 222 are respectively positioned to be actuated by the carrier 12 for reversing the direction of rotation of the motor 58 as the carrier 12 reaches the opposite horizontal extremities of its path of travel along the rails 34 and 36. To this end, a pair of spring-loaded actuator members may be provided at opposite sides of the carrier 12 only one such spring-loaded actuator 224 being here illustrated. Provision of the spring-loading of actuator member 224 permits some amount of over-travel of the carrier 12 without damage to either the carrier, the actuator or the limit switches.

As previously noted, the cams 42 (42a), 44, etc. are formed on a single elongate base member or track 49, 49a (see FIG. 2) which extends substantially the entire horizontal extent of the path of travel. Hence the tracks and cams together define an "upper" track for rollers 90, 92. These base members 49, 49a also have substantially flat, elongate undersurfaces which define lower track or track means 230 which thereby also extend substantially the full horizontal extent of the path of travel. A pair of additional end guide members or means 232 and 234 are provided at respective opposite ends of the upper track and lower track 230 for respectively guiding the carrier between the cams of the upper track 49 and the lower track 230. Hence rollers 90, 92 ride on the cams during motion in a first direction (from left to right as viewed in FIG. 1) along the path of travel for causing the fixture to contact each of the fluid release means as previously described. Thereafter the carrier means, and in particular the rollers 90 and 92 thereof, ride along the lower surface or track means 230 during motion of the carrier 12 in the opposite direction.

In this regard, the first additional guide member 232 comprises a generally downwardly angled guide track portion to guide rollers 90, 92 from the upper track to the lower track. On the other hand, the additional guide member or means 234 comprises a generally wedge-shape ramp-like member for guiding the rollers 90, 92 from the lower track 230 back to the upper track. An additional, spring-loaded "trap door" member 236 is provided and is pivotally mounted at 238 to permit guide rollers 90 and 92 to traverse upwardly on guide member 234, and thereafter closes therebehind to allow guide members 90 and 92 to traverse the upper surface thereof to reach the initial cam member 42. Hence, guide member 234 permits the carrier 12 to return to an initial or starting position with respect to its path of travel so as to further traverse the path of travel along the cams 42, 44, etc. in the first direction, that is from left to right as viewed in FIG. 1.

It will be appreciated that the previously described downward spring biasing of the yoke member or portion 80 with respect to the carrier block portion 70 further encourages movement of the carrier member downwardly as guided by end guide member 232 onto the lower track 230 for return therealong to its initial position.

Figure 5:
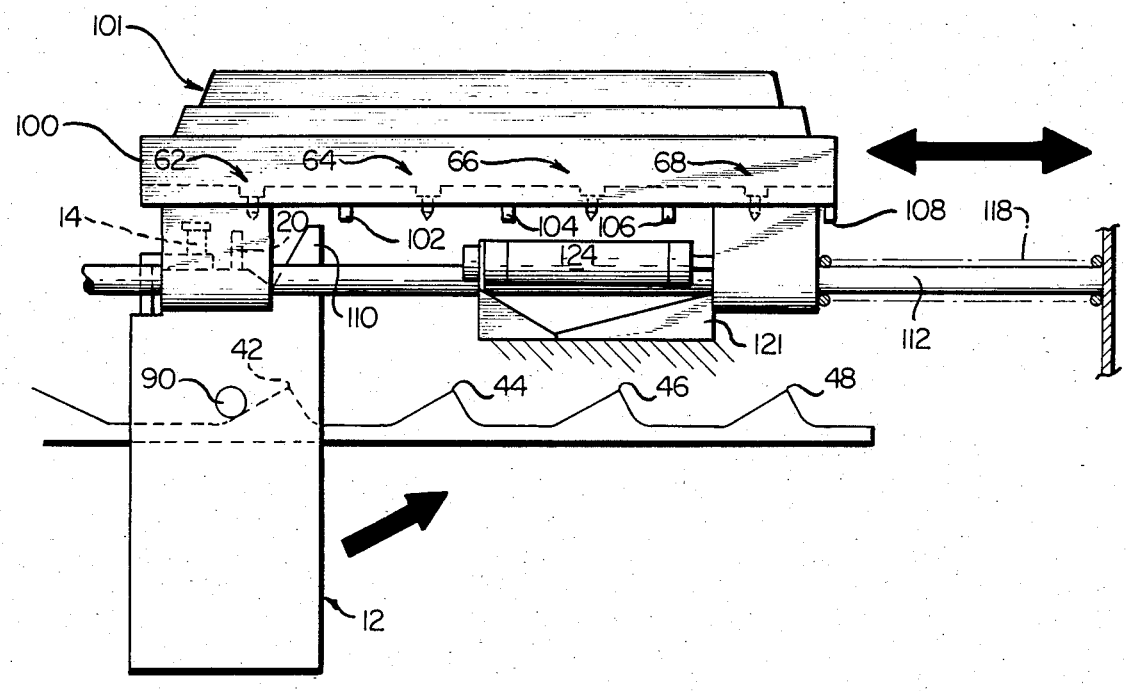
FIGS. 5 and 6 are partial side elevations of the apparatus of the invention, somewhat schematic in form, illustrating various stages or steps in the operation thereof.

From the foregoing, the sequence of movement of the carrier 12 and tray 100 for achieving sequential application of fluid from each of stations 62, 64, etc. to the fixture 14 and contact lens therein will be appreciated. The sequence of motion of carrier 12 and tray 100 with respect to a single station are further schematically illustrated in FIGS. 5 and 6, to which reference is also invited. As seen in FIG. 5, the tray is in its initial or rest position with the return springs 118, 120 fully extended and pressing bearing blocks 114 and 116 into abutment with stop or abutment members 121 and 123. At this time, the projection 110 of carrier 112 is approaching one of the projections 102, etc. of the tray 100. In this regard, the sequence of motion illustrated is the same with respect to each of the four fluid application stations. It will be seen that guide roller 92 is partially advanced with respect to the upwardly ramping leading surface of the associated cam member 42 which is the same with respect to any of the other cams 44, 46, etc.

The next relevant position of carrier 12 and tray 100 are as illustrated in FIG. 1, wherein guide roller 92 has advanced to the peak or uppermost portion of the cam 42. At the same time, the respective projecting members 110 and 102 (or 104, 106, etc.) are interengaged and the tray 100 is carried in the horizontal direction in unison with carrier member 112, thereby moving bearing blocks 114 and 116 away from stops 121 and 123 and compressing springs 118 and 120. At the same time, as previously noted, the projecting tubular elbow portion 160 of inlet conduit 20 is in engagement with and axially displaces the nipple 170 of the fluid release means or valve 72. This causes the release of a premeasured quantity of fluid into fixture 14 for treating or tinting the contact lens therein.

Figure 6:
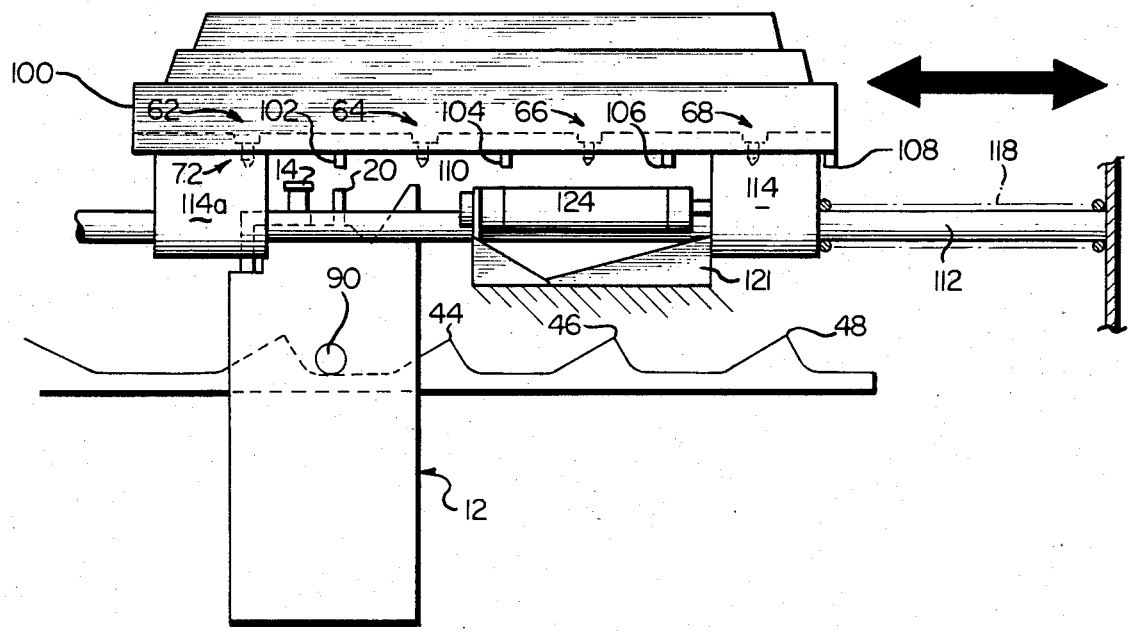

Thereafter, and referring to FIG. 6, the projection 110 disengages the projection 102 (or 104, 106, etc.), permitting the compression springs 118, 120 to drive bearing blocks 114, 116 back against stops 121, 123 thereby returning the tray 100 to its initial or rest position. At the same time, the guide rollers 90, 92 will be seen to have descended opposite or descending portion of the associated cam 42, whereby tubular elbow 160 is out of engagement with nipple 172, resulting in closure of the valve member or release means 72 in the manner described above with reference to FIG. 3. The carrier and projecting member 110 thereof will be seen to be approaching the next succeeding projection (104, 106, etc.) of the tray 100 to repeat the process with respect to the next or subsequent fluid application station thereon.

In accordance with the preferred form of the invention illustrated, an additional timing or time delay switch 250 is located so as to be actuated by the carrier member 12 following the application of fluid or dye from the first station 62. In this regard, it is contemplated that this first station will apply a liquid dye to the lens within the fixture 14, and that this dye is of the type which requires some period of time for setting, before moving on to the following fluid application stations. Accordingly, switch 250 actuates suitable control circuits for the motor 58 to stop rotation thereof and delay further rotation for a suitable preselected period of time to allow the dye to set as desired.

Further in this regard, the preferred form of the invention also accommodates at least one further type of dye requiring a different period of time setting than that provided by the above-described action of the switch 250. Accordingly, an additional, similar timing or time delay switch 252 is provided in the tray 100. When a dye is utilized requiring a different period of time for setting, it is contemplated that the package or unit 101 will include a suitable key, in the form of a projecting part for engaging and actuating switch 252. The control circuit for the motor will respond to actuation of switch 252 by modifying or changing the amount of delay time initiated by actuation of the switch 250, so as to give a second preselected delay time, as desired, for the alternate type of dye or dyeing process to be accommodated.

The invention contemplates a process of the type generally discussed previously herein, wherein three additional fluids or solutions are applied to the contact lens following initial application of a dye thereto. In this regard, it is contemplated that a water soluble, FDA approved liquid dye will be applied at the first station 62, followed by a ten minute to twenty minute delay, as just discussed. It will be recalled that the fixture is heated to encourage the dye to permeate the surface of the lens. Upon resumption of the process and of rotation of the motor, the carrier advances to the next station 64 which dispenses a quantity of approximately five milliliters of a 5% sodium nitrite solution. In the following station, approximately five milliliters of a 5% sulfuric acid is dispensed. At this point, a color reaction occurs, with the sulfuric acid acting as an oxidizing agent, causing the dye to precipitate and become a water-insoluble salt entrapped within the polymer matrix of the lens. The final fluid application station 68 applies approximately five milliliters of a 5% sodium bicarbonate solution to neutralize the sulfuric acid previously dispensed during the oxidation phase.

Thereafter, the carrier returns the fixture to the front end of the machine or right-hand side as viewed in FIG. 1A, where it may be removed through a hinged opening or door 254 and broken open, as previously described with reference to FIG. 3, to remove the tinted lens therefrom. An additional hinged lid or door 256 may be provided at the top of the machine or apparatus 10 to permit removal and replacement of dyeing units or packages 101 with respect to the tray 100 in the manner previously described with reference to FIG. 2. From the foregoing it will further be appreciated that the premeasured volume of fluid provided by the diaphragm portion of the valve or pump means previously described with reference to FIG. 4 is preferably on the order of substantially five milliliters. It will be appreciated that fewer or more such pumps or valves, as well as pumps or valves for premeasuring and dispensing different quantities of fluid may be provided without departing from the invention.

While particular embodiments of the invention have been shown and described in detail, it will be obvious to those skilled in the art that changes and modifications of the present invention, in its various aspects, may he made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An apparatus for tinting a soft contact lens which is received in a fixture including inlet means and outlet means for directing predetermined fluids therethrough for engagement with predetermined surfaces of said contact lens to tint said lens, said apparatus comprising: carrier means for carrying said fixture therein in a predetermined orientation; guide means for defining a predetermined path of travel; motive means for propelling said carrier means along said predetermined path of travel; and a plurality of fluid application stations arranged along said path of travel, each fluid application station including fluid release means; said guide means including means for directing said carrier means along said predetermined path of travel under the influence of said motive means, and cam means for directing said carrier means in a direction generally orthogonal to said predetermined path of travel as said carrier means moves along said predetermined path of travel for sequentially aligning and operatively positioning the inlet means of said fixture with each said fluid release means in sequence as said carrier travels along said predetermined path of travel, for delivering a quantity of fluid to the fixture and the contact lens therein from each said fluid application stations.

2. Apparatus according to claim 1 wherein said guide means comprises elongate rail means for directing said carrier means in a generally horizontal direction defining said predetermined path to pass by each of said fluid application stations and said cam means is arranged in predetermined orientations and at predetermined locations along said horizontal line for directing said carrier means, simultaneously with movement in said horizontal direction, in a direction generally orthogonal to said horizontal direction, said predetermined orientations and locations of said cam means being respectively selected for directing said carrier means toward each of said fluid application stations in an orientation for aligning the inlet means of said fixture with the fluid release means of each fluid application station.

3. An apparatus for tinting a soft contact lens which is received in a fixture including inlet means and outlet means for directing predetermined fluids therethrough for engagement with predetermined surfaces of said contact lens, said apparatus comprising: carrier means for carrying said fixture therein in a predetermined orientation; guide means for defining a predetermined path of travel; motive means for propelling said carrier means along said predetermined path of travel; and a plurality of fluid application stations arranged along said path of travel, each fluid application station including fluid release means; said guide means and said motive means cooperating for aligning the inlet means of said fixture with each said fluid release means in sequence as said carrier travels along said predetermined path of travel, for delivering a quantity of fluid to the fixture and the contact lens therein; and said carrier means further including heater means for applying a predetermined amount of heat energy to said fixture and to a contact lens therein.

4. Apparatus according to claim 2 wherein said motive means comprises an elongate screw element substantially coextensive with said rail means, and motor means for rotating said elongate screw element.

5. Apparatus according to claim 4 wherein said carrier means comprises a block member slidably engaged with said elongate rail means and having thread means therethrough engaged with said screw element for linear movement therealong, and a yoke member surroundingly slidably engaged with said block member for movement relative thereto substantially only in said orthogonal direction relative to said horizontal path; said yoke member including means for removably receiving said fixture.

6. Apparatus according to claim 5 wherein said yoke member further includes cooperating guide means coupled therewith for engaging said cam means to cause said movement of said yoke member relative to said block member and in said orthogonal direction in the region of each of said fluid application stations.

7. Apparatus according to claim 2 wherein at least the fluid release means of said plurality of fluid application stations are mounted to a tray member, and further including guide rail means mounting said tray member for movement substantially in a horizontal direction generally parallel with said elongate rail means.

8. Apparatus according to claim 7 wherein said tray member includes a plurality of projections, one associated with each fluid release means, and wherein said carrier means includes a cooperating projection sequentially engagable with each of said plurality of tray means projections as said carrier moves along said path of travel for moving said tray means in unison with said carrier means, said carrier means projections and said tray member projections being located respectively for interengagement to move said tray member in unison with said carrier means substantially simultaneously with the alignment of said fixture inlet means with the fluid release means of each said fluid application station.

9. Apparatus according to claim 2 wherein each said fluid release means comprises valve means having a projecting elongate outlet nipple defining an axis and a flexible, compressible diaphragm coupled with said nipple and responsive to axial displacement thereof for compressing and releasing fluid therethrough; said inlet means including a projecting tubular member coaxially alignable with each of said nipples in response to movement of said carrier along said path of travel, and said projecting tubular member being further movable in a direction for axially displacing each of said nipples to receive fluid therefrom upon movement of said carrier means in said orthogonal direction in response to each of said cam means.

10. Apparatus according to claim 9 wherein each said fluid application station includes a fluid reservoir and each said valve means further includes a first check valve intermediate said diaphragm and said reservoir for blocking flow of fluid to said diaphragm when said diaphragm is compressed, and for permitting said diaphragm to fill with a predetermined, measured quantity of fluid from said reservoir when said diaphragm returns from the compressed condition to an uncompressed condition.

11. Apparatus according to claim 10 wherein each said valve means further includes a second check valve between said diaphragm and said nipple, said second check valve being biased into a closed condition in the absence of said axial displacement of said nipple and responsive to said axial displacement of said nipple for opening substantially simultaneously with compression of said diaphragm to release fluid to said nipple.

12. Apparatus according to claim 11 wherein said valve means further includes a third check valve within said nipple and oriented for substantially preventing back-flow of fluid therethrough.

13. Apparatus according to claim 5 wherein said motor means comprises a reversible motor for bidirectionally rotating said screw element to thereby propel said carrier means bidirectionally in said horizontal direction.

14. Apparatus according to claim 13 and further including limit switch means located at opposite horizontal extremities of said path of travel to be actuated by said carrier means for reversing the direction of rotation of said motor means in response to actuation by said carrier means.

15. Apparatus according to claim 14 wherein said cam means comprise a plurality of cams linked together by a continuous base portion to define an upper track and wherein said guide means further comprises substantially flat, horizontal lower track means defined on an undersurface of said continuous base portion and means at either end of said base portion for guiding said carrier between said upper and lower tracks thereof so as to ride on said cam means during motion in a first direction along said horizontal path of travel for contacting each fluid release means and for riding on said lower track during motion in the opposite direction, in response to reversal of said motor means, for return to an initial position with respect to said path of travel in position to further traverse said path of travel in said first direction.

16. Apparatus according to claim 5 and further including means biasing said yoke member in a direction away from the orthogonal direction of movement thereof relative to said block member for engagement of said inlet means with said fluid release means.

17. Apparatus according to claim 15 and further including means biasing said yoke member in a direction away from the orthogonal direction of movement thereof for engagement of said inlet means with said fluid release means, whereby said carrier moves to said lower track means upon reaching a first end of said cam means and further including cam lead-in surface means at the said first end of said cam means for guiding said carrier means from said lower track to said cam means.

18. Apparatus according to claim 8 and further including spring biasing means for returning said tray to an initial rest position thereof, following release of each of the projections thereof by the cooperating projection of said carrier means.

19. Apparatus according to claim 15 wherein said yoke member further includes cooperating guide means comprising roller means projecting laterally outwardly thereof for engaging said cam means and said lower track means so as to guide said yoke member relative thereto and cause corresponding motion of said yoke member relative to said block member.

20. Apparatus according to claim 4 and further including sensor switch means located in said path of travel adjacent a selected one of said fluid application stations for actuation by said carrier means, and motor control circuit means responsive to actuation of said sensor switch means for stopping rotation of said motor means for a predetermined time interval to thereby permit setting of the fluid applied at said selected station relative to said contact lens prior to movement of said carrier means to a subsequent one of said fluid application stations.

* * * * *